J. E. OLVIS.
AUTOMATICALLY OPERATED STEREOPTICON.
APPLICATION FILED MAY 18, 1917. RENEWED MAR. 31, 1919.
1,321,241.  Patented Nov. 11, 1919.
3 SHEETS—SHEET 1.
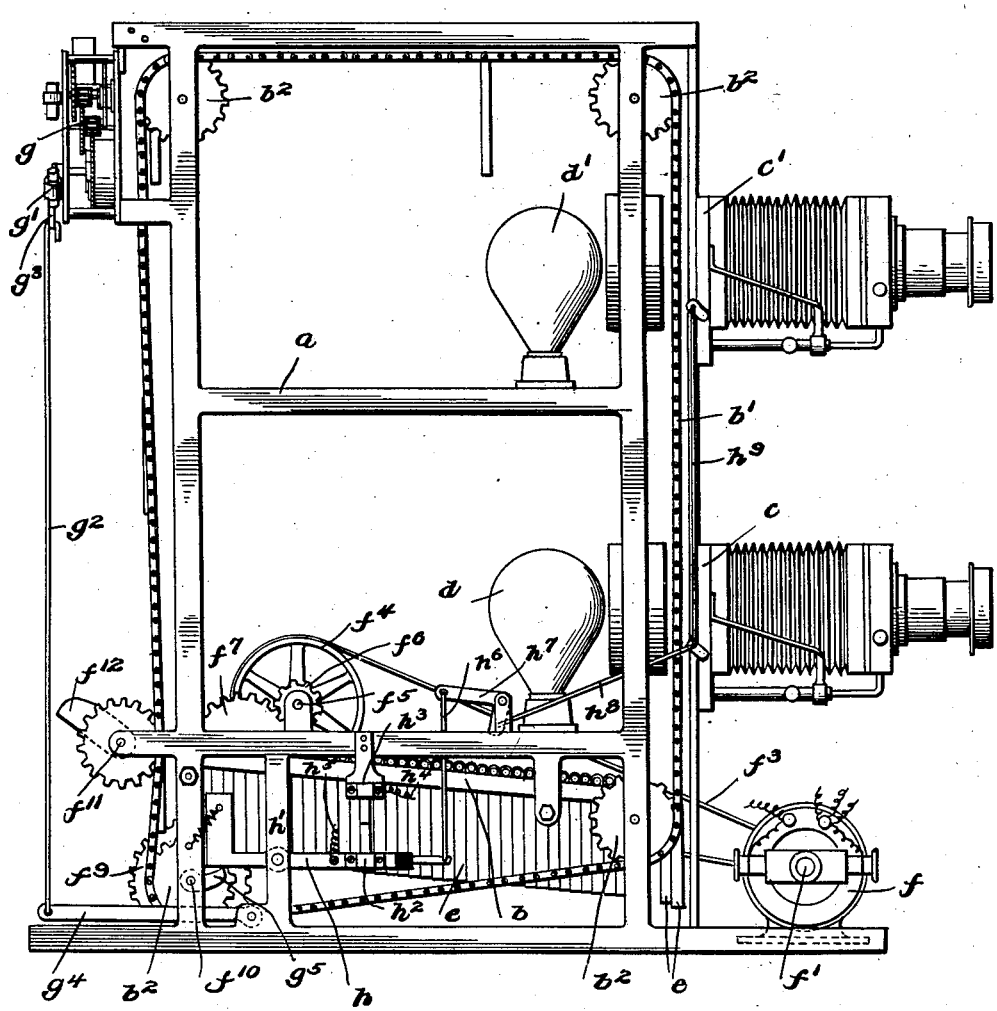

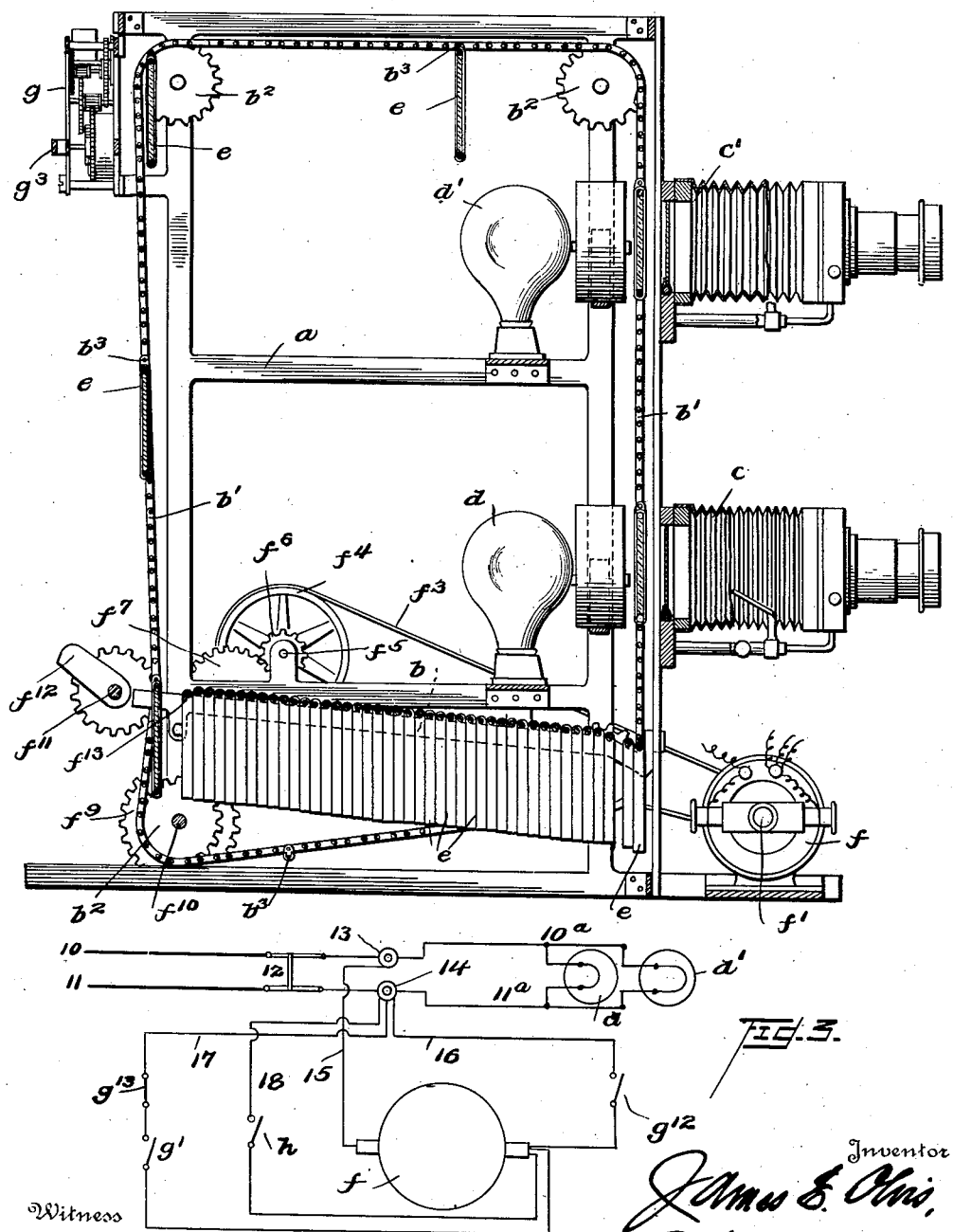

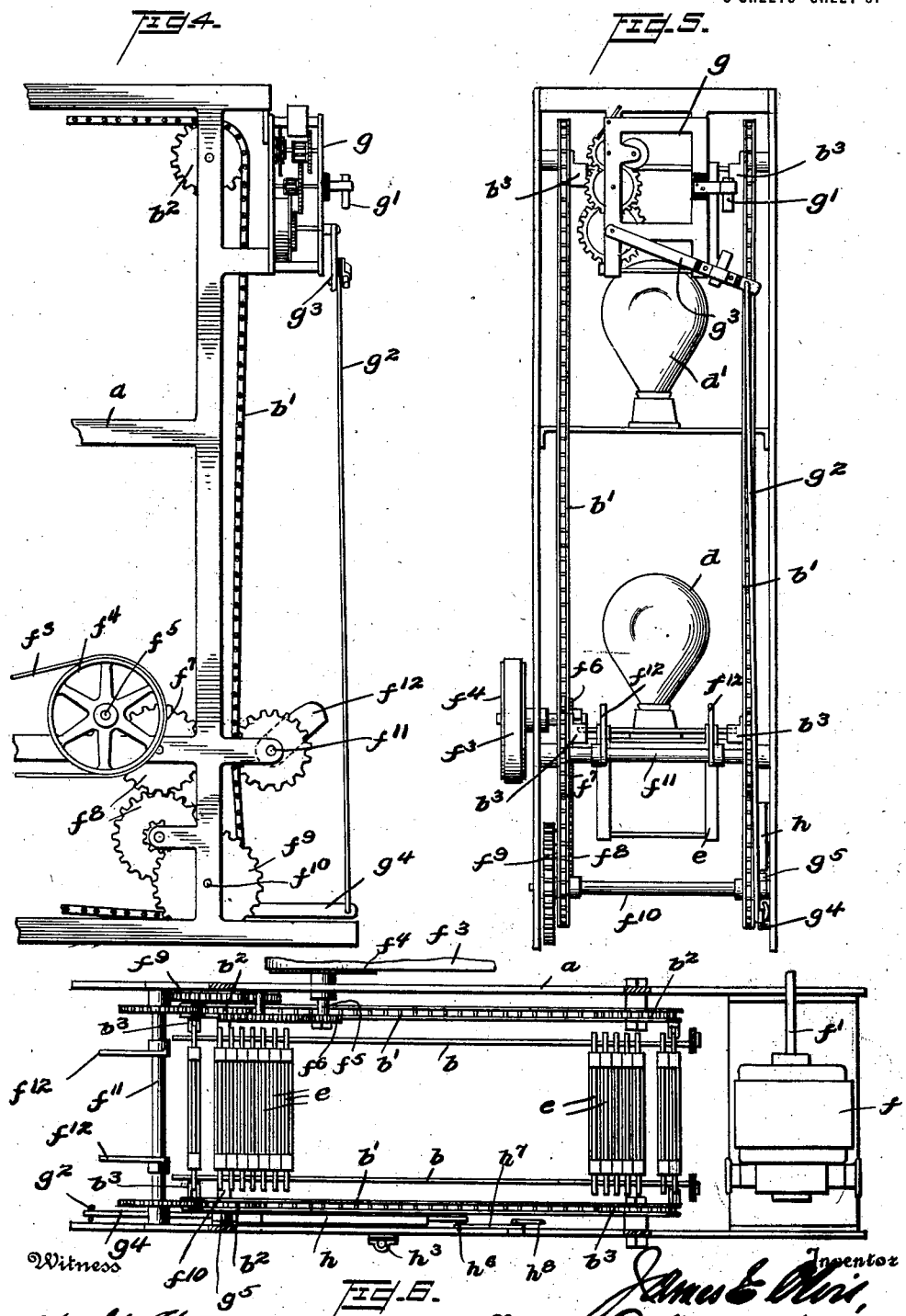

UNITED STATES PATENT OFFICE.

JAMES E. OLVIS, OF PHILADELPHIA, PENNSYLVANIA, ASSIGNOR TO WILLIAMS, BROWN & EARLE INC., OF PHILADELPHIA, PENNSYLVANIA, A CORPORATION OF PENNSYLVANIA.

AUTOMATICALLY-OPERATED STEREOPTICON.

1,321,241.   Specification of Letters Patent.   Patented Nov. 11, 1919.

Application filed May 18, 1917, Serial No. 169,437. Renewed March 31, 1919. Serial No. 286,623.

*To all whom it may concern:*

Be it known that I, JAMES E. OLVIS, a citizen of the United States, residing at the city of Philadelphia, in the county of Philadelphia and State of Pennsylvania, have invented certain new and useful Improvements in Automatically-Operating Stereopticons, of which the following is a specification.

My invention has relation to an automatically operating apparatus for picking up and retarding or stopping slides at any predetermined time in the focal plane of an objective and thereafter lifting them automatically out of such plane and depositing them in a magazine.

My invention has relation further to the timed automatic stopping of the slides presented in the focal plane of the objective in respect to their respective travel to and from the focal plane of said objective.

The slides are picked up and conveyed either singly or in pairs and are presented in the focal plane of the objective or objectives where they momentarily tarry and are then lifted out of such plane and deposited in a magazine therefor, without handling through the employment of timing control means acting periodically to pause in the travel of the slides in the plane of the objective or objectives and by suitable means operated by a motor in freeing and returning the slides to the magazine; the same embracing characteristics as well as essential main features of my present invention.

Hitherto it was proposed to provide a stereopticon in which a series of slides were mounted on a carrier and intermittently actuated by automatic means, whereby they were successively presented to the objective. The different slides requiring different adjustment of the objective to obtain sharp and clear images from all of the slides on the carrier so that it became necessary to manually focus the apparatus for each individual slide as presented in the focal plane of the objective.

According to my invention after first focusing a slide or slides presented in the focal plane of the objective or objectives this focus is maintained and the feeding of the slide or slides into such focal plane is entirely automatic, as is also the pausing of said slide or slides in such plane and movements therefrom and depositing in place or vertical position successively, in the magazine for again being fed forward picked up and lifted into said plane, for again being used.

A furtther important feature of my invention is the arrangement of motor operated mechanism positively actuated for controlling the shutter of each objective in timed relationship to the slide fed into the focal plane of the objective for permitting of timed cutting off or on of light thereto as the slide is fed into and from said focal plane for automatically insuring reliable lighting of a slide as presented and in viewing, as thrown upon a distant screen or wall.

The nature and general scope of my present invention will be more fully understood from the following description taken in connection with the accompanying drawings forming part hereof, in which—

Figure 1, is a side elevational view of an automatic operating stereopticon, embodying the salient features of my invention, showing the objective and lamps, motor and operating mechanism, slide receiving magazine, slide feed means and automatic shutter control operated in timed relation to the slide feed; the said slide feed operating to pick up and present slides separately or in pairs, in the focal plane of the objective or objectives, for exposure through the same.

Fig. 2, is a vertical central sectional view of the apparatus, showing a pair of objectives, lamps, magazine slide feed and release means for depositing and moving forward the slides so deposited in the magazine.

Fig. 3 is a diagrammatic view of the electric circuits with the switches and in which circuits the motor and lamps are included as well as the means for controlling the operation of the shutters to automatically control the light as a slide is presented in the focal plane of the objective as well as cutting off of light between slide presentations in said focal plane.

Fig. 4, is a fragmentary side view of the slide feed and release means.

Fig. 5 is an end view thereof and of the magazine; and

Fig. 6, is a top or plan view of the slide feed, release and the said magazine.

Referring to the drawings, *a*, is a skeleton framing into which the operating members and mechanism of the apparatus are mounted, the magazine, consisting of an inclined carrier $b$, is located in the base of the said framing $a$, and as shown is arranged to contain a hundred or more individual slides which are respectively pushed forward one by one to the front of the framing $a$, into the path of two endless sprocket chains $b^1$, $b^1$ traveling over a series of sprockets $b^2$, $b^2$, arranged in the respective corners of the framing $a$, as clearly shown in Fig. 1. These sprocket chains at suitable distances apart therein, are provided with fingers $b^3$, $b^3$, which are preferably cup-shaped in form. These fingers engage each of the extreme pushed forward slides $e$, of the series of the magazine $b$, for example, as shown in Figs. 1 and 2, and which fingers lift the same into the focal plane of the objective or objectives $c$, $c^1$, arranged projecting from the front of the framing $a$, Figs. 1 and 2, with lamps, $d^1$, located in rear thereof within the framing $a$. The motor $f$, for operating the sprocket chains $b^1$, $b^1$, having the fingers, for engaging the slides presented in the focal planes of the objective is preferably located beneath the lower objective as shown in Figs. 1 and 2. The sprocket chains operate to lift and carry the slides after exposure backward along the upper portion of the framing $a$, and finally lower the same into a position for a releasing means to be hereinafter more fully explained to force each slide onto the magazine-carrier $b$, to cause the same thereafter to be fed forward successively through the magazine, for re-use. The motor shaft $f^1$, carries a belt-pulley, not shown, for the belt $f^3$, encircling a pulley wheel $f^4$, journaled to a studpin $f^5$, on one side of the framing $a$, and also having secured thereto a pinion $f^6$, in mesh with a gear $f^7$, of a train of pinions and gears $f^8$; the lowermost one of which gears $f^9$, is mounted on the shaft $f^{10}$, which is provided with one of the sprocket wheels $b^2$, as clearly shown in Fig. 4. A shaft $f^{11}$, has mounted thereon rotary cam-fingers $f^{12}$, $f^{12}$, adapted to engage the slides as they are deposited on the carrier $b$ and force the same forward. The carrier strips are formed with L-shaped depressions, in which the bars of the slides rest. The rear ends of these strips are without such depressions but the bars of the slides contact therewith and, the chains lower the same and the slides remain on the strips in leaving the fingers. The cams then engage the slide just deposited, and force the same forward until the ends of the bars drop into the L-shaped depressions noted. Of course the slides move forward on the carrier by gravity.

A clock train $g$ is provided for the purpose of controlling the stopping of the slides for projection. The means controlled by the train is a switch having a fixed contact $g^1$, and a movable contact $g^3$, the latter including an arm mounted on an arbor of the clock train and operated through the motive means of such train, as the usual spring, to a position to close the switch. Mechanical means, hereinafter referred to, are provided for opening the switch, and this operation is, of course, against the tension of the clock spring, so that the latter is at all times set for opening the switch, when free to act. The shaft $f^{10}$, carries a cam $g^5$, which when operated depresses the said arm $g^4$, to open the time switch $g^1$, and thus to break the circuit through the motor.

$h$ is a weighted rocking lever which is fulcrumed to a vertical support $h^1$; the opposite end of said lever forms one element of a switch $h^2$, the other element $h^3$, being fastened to the side of the framing $a$, with wires $h^4$, $h^5$, leading therefrom respectively, to the source of electric supply and motor $f$, for cutting on and off the motor or to stop the same. To the extreme forward end of the fulcrumed rocking lever $h$, is pivoted a vertical rod $h^6$, connected with a bell crank lever $h^7$, journaled to the side framing $a$, and by a slanting rod $h^8$, to the shutter, within the objective, the arrangement being such that when the switch is open the shutter likewise is open in the objective for transmission of light therethrough from the electric lamp $d$, in the rear thereof, and when the said switch is closed, the reverse condition of the shutter to that above explained exists. The shutters in the respective objectives shown in Fig. 1, are connected to each by means of a rod $h^9$, whereby both shutters may be operated alternatively to cut on or off the light to or from one of the objectives in case the other one from any cause should become ineffective.

The current of the line circuits 10 and 11, from the source of energy when the knife-switch 12, is established with the binding posts 13, 14, is conducted therefrom through the lamp circuits $10^a$ and $11^a$, and branches 15 and 16 therefrom are arranged with the motor $f$, when the hand switch 12, is shifted to establish the said circuit. In the branch 17 is arranged the switch $g^{13}$ and in the branch 18, the switch $h$. The rotation of the cam $g^5$, opens the switch $g^{13}$, and before the switch closes, opens switch $h$ and stops the motor $f$. When this occurs the slide $e$, is in the focal plane of the objective $c$, and the shutter has been opened by the switch $h$, to project the film or slide upon the distant screen. The slide is held in the focal plane until the switch $g^{13}$, is closed by the clock mechanism $g$ starting thereby the motor for the further feeding of the slides out of the focal plane of the objective and the bringing of another slide into such plane for use. In case any particular slide is to remain for any indefinite period in the focal plane of the objective, the switch $g^{13}$ is opened thus cutting the branch 17 out of the circuit. The operation proceeds as above described except that the motor will not start because the switch $g^{13}$ is open, hence the slide will remain in the focal plane of the objective until the switch $g^{12}$, preferably in the form of a push button is closed, which will then start the motor $f$, so that slides in succession thereafter may be fed into the focal plane of the objective $c$, for exposure therethrough.

Having thus described the nature and objects of my invention, what I claim as new and desire to secure by Letters Patent is:—

1. A stereopticon, a magazine therein for a series of slides, an endless carrier for picking up the foremost slide from the magazine, elevating the same and delivering it to the rear of the magazine, a motor for operating the carrier, two independent circuits for the motor, an automatically operated timing mechanism for one circuit and means for the other circuit controlled by movement of said carrier.

2. A stereopticon, a magazine for a series of slides, an endless carrier for picking up the slides from and delivering the same to the magazine, a motor for operating the carrier, two independent circuits for the motor, a time controlled switch for one circuit, and a switch for the other circuit controlled by the movement of the carrier.

3. A stereopticon, a slide magazine therein, an endless carrier for taking the slides successively from and delivering the same to the magazine, a motor for operating the carrier, a time controlled circuit for the motor, a carrier controlled circuit for the motor, and means operated in the movement of the carrier for opening said switches in succession.

4. A stereopticon, a slide magazine therein, an endless carrier for taking the slides successively from and delivering the same to the magazine, a motor for operating the carrier, two independent circuits for the motor, a switch for one circuit opened in the movement of the carrier, independent means for closing said switch following a predetermined interval, a switch for the other circuit, and means for opening the last named switch following the opening and prior to the closing of the first named switch.

5. A stereopticon, a slide magazine therein, an endless carrier for taking the slides successively from and delivering the same to the magazine, a motor for operating the carrier, a time controlled circuit for the motor, means for opening said circuit independent of the time controlled means, and a carrier controlled circuit for the motor.

6. A stereopticon, a slide magazine therein, an endless carrier for the slides, a motor for operating the carrier, two independent circuits for the motor, a time switch for one circuit, a spring motor for closing said switch, a switch for the other circuit, and a single cam operated in the movement of the carrier for successively opening said switches.

7. A stereopticon, a slide magazine therein, an endless carrier for the slides, an objective, a shutter therefor, a motor for operating the endless carrier, a time-controlled circuit for the motor, a carrier operated circuit for the motor, and means controlled in the governing of the carrier-operated circuit for moving the shutter.

In witness whereof, I have hereunto set my signature in the presence of two subscribing witnesses.

JAMES E. OLVIS.

Witnesses:
J. WALTER DOUGLAS,
MARIAN GROOM.